United States Patent [19]

Martin, Jr.

[11] 3,880,387
[45] Apr. 29, 1975

[54] AIRCRAFT CANOPY EJECTION

[75] Inventor: Edward F. Martin, Jr., Glendale, Calif.

[73] Assignee: The United States of America as represented by the Secretary of the Navy, Washington, D.C.

[22] Filed: June 27, 1974

[21] Appl. No.: 483,499

[52] U.S. Cl. .............................................. 244/121
[51] Int. Cl. ............................................. B64c 1/14
[58] Field of Search.... 244/121, 141, 122 A, 122 R, 244/122 AF, 122 AE

[56] References Cited
UNITED STATES PATENTS

| 3,152,781 | 10/1964 | Martin | 244/122 AF |
| 3,542,319 | 11/1970 | Duncan et al. | 244/121 UX |
| 3,561,703 | 2/1971 | Stencel | 244/122 AF |

Primary Examiner—Trygve M. Blix
Assistant Examiner—Paul E. Sauberer
Attorney, Agent, or Firm—R. S. Sciascia; P. Schneider; N. Brown

[57] ABSTRACT

An aircraft canopy-breakout arrangement including a rigid member hinged to the canopy and positioned adjacent to and in the interior of the canopy at a location above the ejection seat. Fragmentation, destruction and removal of a selected portion of the canopy directly in the region of the rigid member is brought about by the ejection seat coming into sudden contact with the rigid member and pushing it up through the canopy as a result of a propulsive force.

This ensures that the selected area cleared by the rigid member and the ejection seat will not have fragments remaining in the path of the pilot after the ejection has broken through the remaining major portion of canopy that must be removed to produce the opening through which the crew-member in his ejection seat may pass without danger of injury from remaining fragments of canopy.

11 Claims, 3 Drawing Figures

AIRCRAFT CANOPY EJECTION

BACKGROUND OF THE INVENTION

This invention relates to vehicle escape systems, and more particularly to aircraft canopy escape systems.

Many modern high speed aircraft require a system for rapidly ejecting an airman from the aircraft in the event the aircraft or airman is endangered due to damage of malfunction of the aircraft. Various systems have been developed to accomplish this. One well-known system incorporates an explosive charge or other such device that projects the aircraft seat and the airman seated therein inward and out of the aircraft cockpit. With this type of system, it is usually necessary to provide an opening in the aircraft canopy through which the airman and ejection seat can be ejected, or to provide a means for jettisoning the canopy. Unfortunately, jettisoning of the canopy, or removing or opening a portion of it, to permit ejection from the aircraft consumes time and effort on the part of the airman and in some instances where the canopy mechanism is damaged, it may not be possible for the airman to get out.

In order to avoid these difficulties, systems have been designed that project or fire the airman in his aircraft ejection seat through the canopy. This type of system (as for example disclosed in U.S. Pat. No. 3,152,781) permits the airman, even though the canopy cannot be opened, to eject from the aircraft. This is accomplished by ejecting through a break-through-opening in the canopy produced by the ejection seat impacting upon the canopy, which causes fragmentation of the canopy in the vicinity of the ejection seat.

Prior systems of this type, especially where the canopy is strengthened by a structual support in close proximity to the area of canopy through which ejection occurs, have posed a hazard to the ejecting airman. Where there is little structural strengthening of the canopy, the ejection seat acting alone on the canopy can readily cause shattering and fragmentation, thereby creating an unobstructed opening through which the crewmember may pass. But when the crewmember must be ejected through a structurally strengthened area a serious problem arises. Fragments of shattered canopy caused by the ejection seat breakthrough tend to be held in place by the strengthening afforded by the structural support. These fragments remain to obstruct the ejection path with sharp and ragged cutting edges which can easily injure the ejecting crewmember. The aircraft-canopy breakout system of the present invention overcomes this hazard and permits the airman to safely and rapidly eject himself from the aircraft cockpit.

SUMMARY OF THE INVENTION

The present invention provides an aircraft-breakout system that includes a rigid plate-like member located in the path between an aircraft canopy and ejection seat and which is situated closely to specific areas of canopy which are structually supported or strengthened. When pushed by the ejection seat, the rigid member causes fragmentation of the canopy in the immediate vicinity of the rigid member, and thereby produces an assured fragment-free area in the path of an ejecting crew-member —a portion which would otherwise contain potential injury-causing jagged edged canopy fragments.

An aspect of the present invention is that it is useful for ejection of side-by-side seated crew-members.

OBJECTS OF THE INVENTION

An object of this invention is to produce an assured fragment-free area in a selected portion of a break-through opening in an aircraft canopy through which aircraft personnel may be ejected without injury from fragments of canopy remaining in place after break-through by the ejection seat.

Another object of the present invention is to independently produce assured fragment-free areas in selected portions of independent breakthrough openings in an aircraft canopy through which two aircraft crew-members seated in a side-by-side configuration may be independently ejected without injury from fragments of canopy remaining in place after break-through by the ejection seat.

Other objects, advantages and novel features of the present invention will become apparent from the following detailed description of the invention when considered in conjunction with the accompanying drawings.

DETAILED DESCRIPTION OF THE INVENTION

Figure 1:
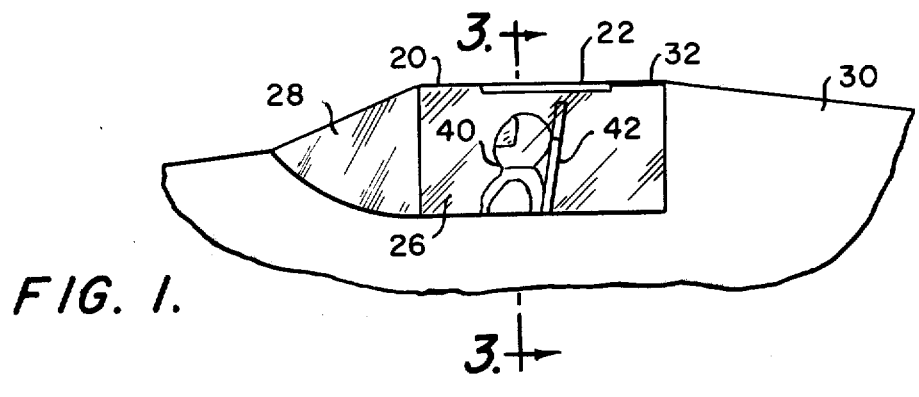
FIG. 1 is a side view of an aircraft canopy on an aircraft embodying the features of the present invention.
Figure 2:
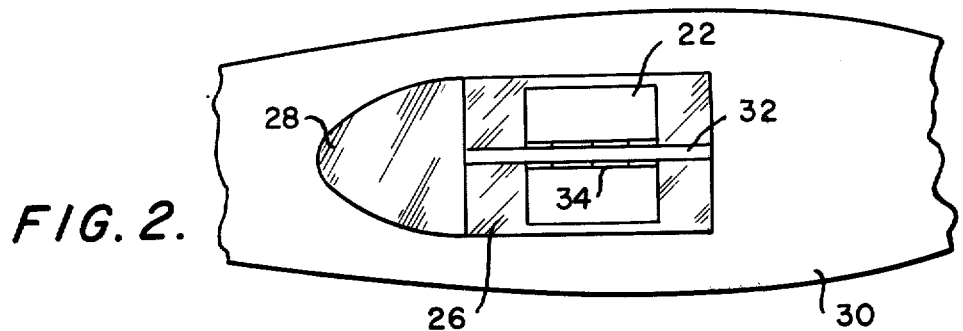
FIG. 2 is a top plan view of the structure illustrated in FIG. 1.
Figure 3:
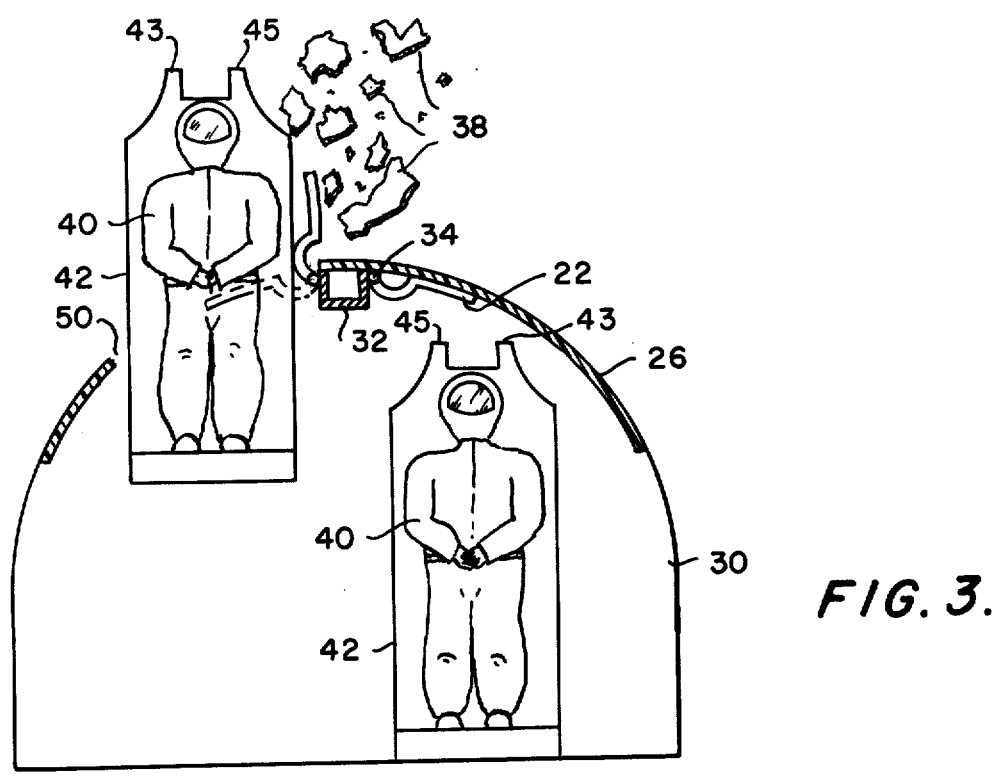
FIG. 3 is an enlarged sectional view of the structure illustrated in FIG. 1 taken along the line 3—3 thereof, and shows the appearance of the canopy immediately above a crew member during the ejection process.

An embodiment of the present invention useful for side-by-side seating of aircraft crew-members is illustrated in FIGS. 1 through 3.

A canopy 26 extends behind a fixed windshield 28 and covers the cockpit region of an aircraft fuselage 30. A structrual member 32, which is located at the top inside of the canopy, runs in the fore-aft direction and has attached to it the canopy 26. The structural member 32 provides support and strengthening to the canopy 26 which is composed of a transparent plastic readily shatterable upon impact, as for example, acrylic. Above each crew member 40 there is provided a rigid plate-like member 22 comprising a generally rectangular, elliptical, or circular shape attached by a hinge 34 to the central canopy structural support member 32 located above and between the crew members 40 and attached to the inner surface of canopy 26.

The rigid member 22 is contiguous to the inside surface of the cockpit and is placed so as to be in the path taken by the ejection seat 42 carrying an aircraft crew-member 40 out of the aircraft through the canopy 26. It is located in the area where structural support is provided to the canopy 26.

When ejection of the crew-member is desired, the ejection seat 42 is activated by a suitable propulsion means, not shown, causing it to assume a predetermined, generally upward path as indicated on the left side of FIG. 3. In the embodiment illustrated, each ejection seat for each crew-member has an upmost portion which is above the head of the crew-member and has a double-pronged shape. After the ejection seat has traveled a short distance, the outer prong 43 comes into contact with the canopy and shatters it. As the ejection seat continues its upward movement, the inner prong 45 causes the plate-like member 22 to pivot up through the canopy completely out of the way of the ejection seat 42, thereby causing shattering, fragmentation and destruction of the canopy 26 in the region close to the structural member 32. Fragmented pieces of canopy falling to one side and out of the path of travel of the ejection-seat 42 and crew-member 40 are indicated at 38 in FIG. 3. In this way an opening 50 is formed in the canopy 26 which enables the ejection seat 42 and the crew-member 40 riding therein to pass therethrough without danger of injury from remaining canopy fragments. The type of material that can be used for the rigid plate-like member 22 includes various types of metals such as aluminium, magnesim, tungsten, steel, and similar metals and their alloys or tough rigid plastics. The rigid plate-like member of the present embodiment is constructed of aircraft structural-type aluminum (such as Alcoa type 75 ST), and is approximately 8 inches in the fore-aft dimension and aproximately 10 inches wide.

It should be noted that rigid member 22 may be constructed and hinged so that it falls away after rotating 90° up through the canopy. Also, it should be understood that various configurations of ejection seat other than the specific two-prong type illustrated and described, are suitable for fragmenting the canopy 26 in accordance with the present invention.

The present invention is also useful where only a single crew-member need by ejected through the canopy in which case the construction and operation will be similar to that described for the embodiment shown in FIGS. 1 through 3, the difference being in the use of only one rigid plate-like member 22 positioned above the crew-member in the path of the ejection seat.

Obviously, many modifications and variations of the present invention are possible in the light of the above teachings. It is therefore to be understood that, within the scope of the appended claims, the invention may be practiced otherwise than as specifically described.

What is claimed is:

1. In an aircraft having a canopy and carrying crew-members each seated in a respective ejection seat, a canopy breakaway apparatus comprising:
 a rigid plate-like member adjacent said canopy above each ejection seat;
 pivoting means supporting said plate-like member in the interior of said canopy whereby an upward impact force acting on said plate-like member causes it to pivot into said canopy and shatter it, and to continue to swing outward to produce an opening in said canopy.

2. An aircraft canopy breakaway opening apparatus in accordance with claim 1, wherein said force is provided by said ejection seat acting on said rigid member.

3. An aircraft canopy breakaway opening apparatus in accordance with claim 1, wherein said plate-like member comprises a generally rectangular shape.

4. An aircraft canopy breakaway opening apparatus in accordance with claim 1, wherein said aircraft personnel are seated in a side-by-side configuration.

5. An aircraft canopy breakaway opening apparatus in accordance with claim 1, wherein said plate-like member is curved to fit the canopy configuration.

6. In an aircraft having a canopy and carrying crew-members each seated in a respective ejection seat, a canopy breakaway apparatus comprising:
 a rigid plate-like member adjacent said canopy above each ejection seat;
 pivoting means supporting said plate-like member in the interior of said canopy; and
 a rigid structural member extending from the aircraft fuselage along the inside of said canopy, said pivoting means being supported by said structural member, whereby an upward impact force acting on said plate-like member causes it to pivot into said canopy and shatter it, and to continue to swing outward to produce an opening in said canopy.

7. An aircraft canopy breakaway opening apparatus in accordance with claim 6, wherein said force is provided by said ejection seat acting on said rigid member.

8. An aircraft canopy breakaway opening apparatus in accordance with claim 6, wherein said plate-like member comprises a generally rectangular shape.

9. An aircraft canopy breakaway opening apparatus in accordance with claim 6, wherein said aircraft personnel are seated in a side-by-side configuration.

10. An aircraft canopy breakaway opening apparatus in accordance with claim 6, wherein said plate-like member is curved to fit the canopy configuration.

11. A crewman ejection seat arranged under the shatterable canopy of a fast traveling vehicle comprising:
 a. a mechanically hinged plate in the interior of and adjacent said canopy;
 b. a relatively rigid body which has a width which is wider than said crewman and to which the crewman of the vehicle may be attached; said body being below said hinged plate;
 c. said rigid body having as an integral unitary part thereof a top portion behind and above the head of the crewman and which body is provided with spaced projections on generally opposite sides of the location of the crewman for successively striking said hinged plate and canopy to cause said canopy to shatter when said seat is ejected.

* * * * *